United States Patent
Pozzana (10) Patent No.: US 9,499,976 B2
(45) Date of Patent: Nov. 22, 2016

(54) METHOD OF PERFORATING A FOAM STRUCTURE AND AN ACOUSTIC FOAM STRUCTURE

(75) Inventor: Fabio Pozzana, Milan (IT)

(73) Assignee: Sealed Air Corporation (US), Charlotte, NC (US)

( * ) Notice: Subject to any disclaimer, the term of this patent is extended or adjusted under 35 U.S.C. 154(b) by 294 days.

(21) Appl. No.: 14/117,524

(22) PCT Filed: May 15, 2012

(86) PCT No.: PCT/EP2012/059050
§ 371 (c)(1),
(2), (4) Date: Apr. 24, 2015

(87) PCT Pub. No.: WO2012/156416
PCT Pub. Date: Nov. 22, 2012

(65) Prior Publication Data
US 2015/0225942 A1    Aug. 13, 2015

(30) Foreign Application Priority Data
May 16, 2011    (EP) .................................... 11166286

(51) Int. Cl.
| | |
|---|---|
| *E04B 1/86* | (2006.01) |
| *E04B 1/84* | (2006.01) |
| *B29C 44/56* | (2006.01) |
| *G10K 11/16* | (2006.01) |
| *B32B 5/32* | (2006.01) |
| *B32B 37/18* | (2006.01) |
| *B32B 38/04* | (2006.01) |

(52) U.S. Cl.
CPC .............. *E04B 1/84* (2013.01); *B29C 44/569* (2013.01); *B29C 44/5663* (2013.01); *B32B 5/32* (2013.01); *B32B 37/18* (2013.01); *B32B 38/04* (2013.01); *G10K 11/16* (2013.01); *B29K 2995/0002* (2013.01); *B32B 2038/047* (2013.01); *B32B 2250/22* (2013.01); *B32B 2305/022* (2013.01); *B32B 2307/102* (2013.01); *B32B 2607/00* (2013.01); *Y10T 156/1056* (2015.01)

(58) Field of Classification Search
CPC ........................................................ E04B 1/86
USPC .................................. 181/293, 290, 284, 286
See application file for complete search history.

(56) References Cited

U.S. PATENT DOCUMENTS 1,554,179 A * 9/1925 Trader ..................... 181/293
3,507,355 A * 4/1970 Lawson ................... 181/292

(Continued)

FOREIGN PATENT DOCUMENTS

| EP | 1026194 B1 | 3/2005 |
| JP | 04307227 | 10/1992 |
| WO | 2010036562 A1 | 4/2010 |

*Primary Examiner* — Forrest M Phillips
(74) *Attorney, Agent, or Firm* — Daniel B. Ruble (57) ABSTRACT

A method of producing a composite foam structure (60) comprising the steps of: perforating at least two foam structures by a method of perforating a foam structure (10) comprising the steps of: perforating the foam structure so as to form at least one first channel (1) that extends fully through the foam structure; and perforating the foam structure so as to form at least one second channel (2) that extends only partly through the foam structure; and laminating a perforated surface of one of the at least two foam structures to a perforated surface of another of the at least two foam structures.

17 Claims, 3 Drawing Sheets

(56) References Cited

U.S. PATENT DOCUMENTS

| | | | |
|---|---|---|---|
| 4,160,491 A * | 7/1979 | Matsumoto et al. | 181/284 |
| 5,585,058 A | 12/1996 | Kolosowski | |
| 5,962,107 A * | 10/1999 | Lowery et al. | 428/131 |
| 6,290,022 B1 * | 9/2001 | Wolf et al. | 181/292 |
| 6,435,512 B1 | 8/2002 | Beckwith, Sr. | |
| 6,720,069 B1 * | 4/2004 | Murakami et al. | 428/319.3 |
| 2003/0006092 A1 * | 1/2003 | D'Antonio et al. | 181/293 |
| 2005/0167193 A1 * | 8/2005 | Van Reeth | 181/293 |

* cited by examiner

METHOD OF PERFORATING A FOAM STRUCTURE AND AN ACOUSTIC FOAM STRUCTURE

TECHNICAL FIELD

The present invention relates to a method of perforating a foam structure and to an acoustic foam structure. The acoustic foam structure absorbs sound and/or performs sound insulation.

BACKGROUND ART

Acoustic foam structures are used for soundproofing. The acoustic foam attenuates airborne sound waves by increasing air resistance, thus reducing the amplitude of the waves. The energy is dissipated as heat.

An acoustic foam structure can be used in, for example, a sound baffle and a noise barrier. A sound baffle primarily absorbs sound, whereas the noise barrier primarily stops sound from travelling from one place to another (i.e. sound insulation).

A sound baffle may comprise an acoustic foam structure that reduces the strength of airborne sound. Sound baffles may be applied to walls and ceilings in building interiors to absorb sound energy and thus lessen reverberation.

A noise barrier may comprise an acoustic foam structure. The noise barrier mitigates noise in places such as roadways, railways and industrial sites.

Open-celled materials and fibre-based materials are known to absorb sound via a porous absorption mechanism. Closed-cell products such as foam have also been shown to absorb sound, but through a membrane mechanism rather than the porous absorption mechanism. An acoustic foam material may be perforated to exploit both the porous absorption mechanism and the membrane mechanism.

U.S. Pat. No. 5,962,107 discloses a low density foam material that is perforated to form a perforated cellular sound absorption material. U.S. Pat. No. 5,962,107 discloses samples that were drilled to a 50% penetration depth and a 100% penetration depth. The samples had stepped perforations.

For example, EP 1 115 777 B1 discloses that the usefulness of a particular polymeric foam in sound management (for example, sound absorption and sound insulation) is partly dependent upon the foam having a substantially open-cell structure. The document further discloses that depending on the percentage of closed-cells that are to be opened, the application of the means for opening can extend only partially through the thickness of the base foam.

WO 2010/036562 A1 discloses laminating two or more perforated polymeric foams together such that a perforated surface of one perforated foam adheres to a perforated surface of another perforated polymeric foam to form an acoustical polymeric foam. Each perforated polymeric foam has perforation channels that extend in a continuous linear fashion all the way through the perforated polymeric foam.

An object of the present invention is to provide a method of perforating a foam structure. Another object is to provide an acoustic foam structure.

DISCLOSURE OF INVENTION

According to the present invention there is provided a method of producing a composite foam structure comprising the steps of:

perforating at least two foam structures by a method of perforating a foam structure comprising the steps of:

perforating the foam structure so as to form at least one first channel that extends fully through the foam structure; and perforating the foam structure so as to form at least one second channel that extends only partly through the foam structure; and laminating a perforated surface of one of the at least two foam structures to a perforated surface of another of the at least two foam structures.

By combining the at least one first channel that extends fully through the foam structure with the at least one second channel that extends only partly through the foam structure, the resulting perforated foam structure discloses better soundproofing properties than a foam structure that has either only channels that extend fully through the foam structure or only channels that extend only partly through the foam structure.

By laminating a perforated surface of one of the at least two foam structures to a perforated surface of another of the at least two foam structures, it is possible to produce composite foam structures of any thickness by laminating perforated acoustic foam structures of the present invention. This is an easier way to produce thick foam structures than producing an acoustic foam of the desired thickness and subsequently perforating it.

Optionally, the method further comprises the step of perforating the foam structure so as to form at least one third channel that extends only partly through the foam structure, wherein the at least one second channel and the at least one third channel extend from opposite surfaces of the foam structure.

Hence, the resulting foam structure may comprise channels that extend only partly through the foam structure from opposite surfaces of the foam structure. Accordingly, the sound absorption and/or sound transmission loss properties of the foam structure are further improved. Furthermore, the foam structure is less likely to warp after perforation compared to a foam structure in which the channels that extend only partly through the foam structure extend from only one side of the foam structure. This is particularly the case when the channels that extend only partly through the foam structure are formed before the foam structure has fully cooled following its formation (e.g. by extrusion and expansion).

Preferably, said perforating the foam structure so as to form the at least one first channel comprises puncturing the foam structure with at least one first object elongate in a longitudinal direction by moving the at least one first elongate object relative to the foam structure substantially only in the longitudinal direction of the at least one first elongate object.

Hence, the first elongate object may enter substantially vertically when the foam structure is motionless so that the resulting at least one first channel has substantially the same cross-sectional dimensions and/or shape as the at least one first elongate object.

Preferably, said perforating the foam structure so as to form the at least one second channel and/or the at least one third channel comprises puncturing the foam structure with at least one second object elongate in a longitudinal direction by moving the at least one second elongate object relative to the foam structure both in the longitudinal direction and in a transverse direction of the at least one second elongate object.

Hence, perforation to form the at least one second channel and optionally the at least one third channel that extend only partly through the foam structure can be accomplished in a continuous process. The foam structure may be formed by extrusion. The expanded foam structure may then be continuously penetrated by the at least one second elongate object while the foam structure is moving.

Preferably, said perforating the foam structure so as to form the at least one second channel and/or the at least one third channel comprises puncturing the foam structure with at least one second object elongate in a longitudinal direction so as to form the at least one second channel and/or the at least one third channel to have a width greater than a width of the at least one second elongate object.

Hence, the movement of the foam structure relative to the at least one second elongate object may result in enlarging of the channels that extend only partly through the foam structure as a result of the movement of the at least one second elongate object relative to the foam structure.

Preferably, the at least one second elongate object is disposed on a rotating roller so as to puncture the foam structure with the at least one second elongate object.

Accordingly, the perforation step that forms the at least one second channel and optionally the at least one third channel can be accomplished in a continuous process in which a plurality of second elongate objects are arranged in a predetermined pattern on the surfaces of at least one rotating roller. Following extrusion, the expanded foam structure may be guided between a pair of rotating rollers, whereupon the rotation of the rollers causes the needles to penetrate opposite surfaces of the foam structure so as to form the at least one second channel and the at least one third channel.

The at least one first channel and the at least one second channel may extend in substantially parallel directions or, alternatively, they may be formed at an angle with respect to the normal to the upper and lower surfaces of the foam.

In case at least one first channel and the at least one second channel extend in substantially parallel direction, they perforate different sets of closed cells of the foam structure. The channels in the foam structure may be substantially linear and straight.

Preferably, the at least one first channel and the at least one second channel are formed by puncturing the same planar surface of the foam structure.

Accordingly, the perforating method is simple in that only the same planar surface of the foam structure has to be accessible for perforating both the at least one first channel that extends fully through the foam structure and the at least one second channel that extends only partly through the foam structure.

Preferably the method comprises the step of producing the at least two foam structures by extrusion.

Accordingly, the present invention provides a method of producing a foam structure that has improved sound absorption and/or sound transmission loss properties.

Preferably, said at least two foam structures are laminated to each other such that substantially each of the at least one first channel of said one of the foam structures is offset from all of the at least one first channel of said another of the foam structures.

Accordingly, it is not necessary to align the channels from one foam layer to another. This makes it easier to manufacture the foam structure.

Preferably, said at least two foam structures are laminated to each other such that substantially each of the at least one first channel of said one of the foam structures is aligned with a corresponding at least one first channel of said another of the foam structures.

This allows the composite foam structure to have channels that extend all the way through the structure in addition to channels that extend only partly through the whole thickness of the structure.

According to a further aspect of the present invention, there is provided a perforated foam structure that has been formed by the method as described in any of the above paragraphs.

According to a further aspect of the present invention there is provided a composite foam structure comprising at least two acoustic foam structures, each comprising:

at least one first channel that extends fully through the acoustic foam structure; and at least one second channel that extends only partly through the acoustic foam structure;

wherein a perforated surface of one of the acoustic foam structures is laminated to a perforated surface of another of the acoustic foam structures.

By combining the at least one first channel that extends fully through the foam structure with the at least one second channel that extends only partly through the foam structure, the resulting perforated foam structure absorbs more sound and/or transmits less sound than a foam structure that has either only channels that extend fully through the foam structure or only channels that extend only partly through the foam structure.

By forming a composite foam structure from at least two acoustic foam structures, the composite foam structure can be of any thickness by being a laminate of perforated acoustic foam structures of the present invention. This is an easier way to produce thick foam structures than producing an acoustic foam of the desired thickness and subsequently perforating it.

Preferably, the percentage of the thickness of each of the at least two acoustic foam structures through which the at least one second channel extends is up to about 85%.

Accordingly, it is possible to modulate, and thereby optimise, the properties of the foam structure, such as its mechanical resistance, sound insulation and water absorption. In particular, by combining the at least one first channel that extends fully through the foam structure with the at least one second channel that extends only up to 85% through the foam structure, the resulting perforated foam structure has better soundproofing properties than a foam structure that has either only channels that extend fully through the foam structure or only channels that extend only partly through the foam structure. By providing that the at least one second channel extends up to about 85% of the way through the acoustic foam structures, the resulting perforated foam structure has better soundproofing properties than otherwise.

Preferably, the acoustic foam structure further comprises at least one third channel that extends only partly through the acoustic foam structure, wherein the at least one second channel and the at least one third channel extend from opposite surfaces of the acoustic foam structure.

Hence, the acoustic foam structure may comprise channels that extend only partly through the foam structure from opposite surfaces of the foam structure. Accordingly, the sound absorption and/or sound transmission loss of the foam structure is improved. Furthermore, the foam structure is less likely to warp after perforation compared to a foam structure in which the channels that extend only partly through the foam structure extend from only one side of the foam structure. This is particularly the case when the channels that extend only partly through the foam structure are formed before the foam structure has fully cooled following its formation (e.g. by extrusion and expansion).

Preferably, a width of the at least one second channel is greater than a width of the at least one first channel.

Accordingly, the channels that extend only partly through the foam structure can be formed by a continuous process in which the foam structure is punctured by, for example, elongate objects disposed on rotating rollers. This results in channels that have larger dimensions that the elongate objects on the rotating rollers. Subsequently, the foam structure can be perforated again whilst it is motionless by elongate objects such that the channels that extend fully through the foam structure have substantially the same dimensions as the elongate objects used to perforate the foam structure.

In one embodiment of the present invention, the at least one first channel and the at least one second channel extend in substantially parallel directions.

Hence, the channels that extend fully through the foam and the channels that extend only partly through the foam perforate different sets of closed cells of the foam structure. The channels in the foam structure may be substantially linear and straight.

Preferably, the at least one first channel and the at least one second channel extend from the same planar surface of the acoustic foam structure.

Accordingly, the perforating method for forming the acoustic foam structure is simple in that only the same planar surface of the foam structure has to be accessible for perforating both the at least one first channel that extends fully through the acoustic foam structure and the at least one second channel that extends only partly through the acoustic foam structure.

Preferably, a thickness of the acoustic foam structure is within a range of from about 15 mm to about 30 mm; and/or
a width of the acoustic foam structure is within a range of from about 500 mm to about 1100 mm; and/or
a length of the acoustic foam structure is within a range of from about 2,000 mm to about 3,000 mm; and/or
an average width of the at least one first channel is within a range of from about 1.0 mm to about 3.0 mm; and/or
an average width of the at least one second channel, and optionally the at least one third channel, is within a range of from about 1.0 mm to about 3.0 mm; and/or
a percentage of the thickness of the acoustic foam structure through which the at least one second channel, and optionally the at least one third channel, extends is within a range of from about 60% to about 80%.

Accordingly, it is possible to modulate, and thereby optimise, the properties of the foam structure, such as its mechanical resistance, sound insulation and water absorption.

Optionally, substantially each of the at least one first channel of said one of the acoustic foam structures is offset from all of the at least one first channel of said another of the acoustic foam structures.

Optionally, substantially each of the at least one first channel of said one of the acoustic foam structures is aligned with a corresponding at least one first channel of said another of the acoustic foam structures.

Preferably, each of the at least two acoustic foam structures is formed from a single piece of foam.

Preferably, foam material is continuous throughout each of the at least two acoustic foam structures.

MODE FOR THE INVENTION

Figure 1:
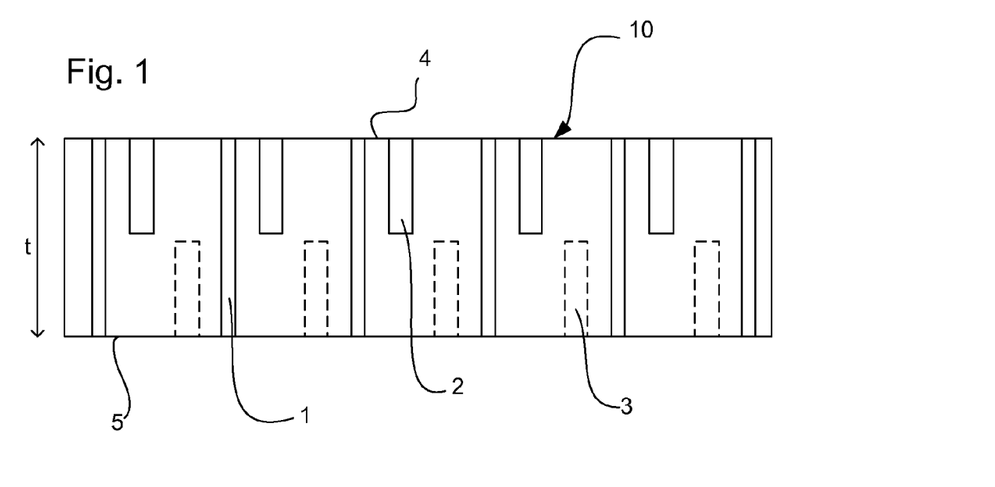
FIG. 1 is a cross-sectional view of an acoustic foam structure of an embodiment of the present invention.

FIG. 1 is a cross-sectional view of an embodiment of a foam structure 10 of the present invention. The foam structure 10 is perforated by a method of perforating the foam structure 10 according to an embodiment of the present invention.

The method of perforating the foam structure 10 comprises the steps of perforating the foam structure 10 so as to foam at least one first channel 1 that extends fully through the foam structure 10, and perforating the foam structure 10 so as to form at least one second channel 2 that extends only partly through the foam structure 10.

By combining the at least one first channel 1 that extends fully through the foam structure 10 with the at least one second channel 2 that extends only partly through the foam structure 10, the resultant foam structure 10 has improved sound absorption and/or sound transmission loss properties compared to alternative foam structures which have either only channels that extend fully through the foam structure or only channels that extend only partly through the foam structure.

In an embodiment, the method of perforating comprises the step of perforating the foam structure so as to form at least one third channel 3 that extends only partly through the foam structure 10. The at least one second channel 2 and the at least one third channel 3 extend from opposite surfaces 4, 5 of the foam structure such that they extend in substantially parallel directions.

Hence, the resulting foam structure 10 may comprise channels 2, 3 that extend only partly through the foam structure 10 from opposite surfaces 4, 5 of the foam structure 10. Accordingly, the sound absorption and/or sound transmission loss properties of the foam structure 10 are further improved.

Furthermore, the foam structure 10 is less likely to warp after perforation compared to a foam structure 10 in which the channels that extend only partly through the foam structure extend from only one side of the foam structure. This is particularly the case when the channels that extend only partly through the foam structure are formed before the foam structure has fully cooled following its formation (e.g. by extrusion and expansion).

In an embodiment, the foam structure 10 is a unitary foam structure 10. This means that the foam structure 10 is formed from a single piece of foam. The foam material is continuous throughout the unitary foam structure 10. The unitary foam structure 10 is not formed from a plurality of assembled constituent parts. The unitary foam structure 10 is a single foam layer. The unitary foam structure 10 is non-laminated. The unitary foam structure 10 may form a single foam layer in a composite foam structure 60 that is formed from constituent foam layers.

The foam structure 10 may be an acoustic foam structure 10 comprising the at least one first channel 1 that extends fully through the foam structure and the at least one second channel 2 that extends only partly through the foam structure

10. The acoustic foam structure 10 may comprise a closed-cell foam that is perforated by the method of perforating of the present invention.

The cells of the foam that are punctured during the method of perforating are open cells. The remaining cells that are not punctured during the method of perforating remain as closed cells in the foam.

Generally, most of the cells in the acoustic foam structure 10, after perforation, are closed cells. Preferably from about 40 to 90%, more preferably from 60 to 80%, even more preferably from 65 to 75% of the cells of the foam structure 10 remain as closed cells after perforation according to the method of the present invention.

Accordingly, from 60% to 10%, preferably from 40% to 20%, more preferably from 35% to 25%, even more preferably about 30% of the cells of the foam structure 10 are open cells Said percentage of open cells results in a foam structure 10 having good sound absorption properties.

Substantially all of the cells of the foam that are not in direct fluid communication with any of the at least one first channel 1, the at least one second channel 2 and the at least one third channel 3 are closed cells.

Accordingly, in environments that have a high humidity level, the acoustic foam structure 10 of the present invention absorbs only a very small amount of liquid. Hence, the acoustic foam structure 10 of the present invention retains its structural integrity even in high humidity environments and/or high temperature environments. The sound absorption and sound insulation performance of the acoustic foam structure 10 of the present invention is maintained even in these environments.

The acoustic foam structure 10 of the present invention may be used for either or both of sound absorption and sound transmission loss (i.e. sound insulation).

The present invention provides a sound baffle comprising the acoustic foam structure 10 of the present invention. The sound baffle primarily absorbs sound. The sound baffle may comprise a panel that comprises the acoustic foam structure 10 of the present invention. The mechanism by which the closed cells of the acoustic foam structure 10 absorb sound is different from the mechanism by which the open cells of the acoustic foam structure 10 absorb sound.

For the open cells, sound is absorbed through a porous absorption mechanism. A sound wave that is incident on a surface of the acoustic foam structure 10 propagates into the open cells of the acoustic foam structure 10. For example, the sound wave may propagate into the acoustic foam structure 10 through one or more of the channels 1, 2, 3 formed by perforation. The sound wave causes gas molecules in the open cells to undergo oscillatory motion. As the gas molecules move against solid surfaces such as the walls of the open cells, the acoustic energy of the sound wave is lost via friction as heat energy.

For the closed cells, sound is absorbed through a membrane mechanism. A sound wave that is incident on a surface of the acoustic foam structure 10 causes the walls of external closed cells to undergo vibration. An external closed cell is a closed cell of the foam structure 10 that has at least one surface that comes into direct contact with the environment immediately surrounding the acoustic foam structure 10. As the walls of the external closed cell vibrate, this causes the walls of successive internal closed cells to vibrate. An internal closed cell is a cell that does not come into direct contact with the environment immediately surrounding the acoustic foam structure 10. As the walls of the cells vibrate, the acoustic energy of the sound wave is lost via both the motion of gas molecules in the closed cells and through the straining of the walls of the closed cells as heat. This mechanism is termed the membrane mechanism because the walls of the closed cells of the acoustic foam structure 10 act as membranes.

Hence, the acoustic foam structure 10 of the present invention absorbs sound by both the porous absorption mechanism and the membrane mechanism as described above. The combination of the at least one first channel 1 and the at least one second channel 2, optionally with the at least one third channel 3 improves the sound absorption properties of the acoustic foam structure 10, compared to alternative foam structures which have either only the first channels or only the second and third channels. This is because the foam structure 10 has an irregular surface. An irregular surface has better sound absorption properties compared to a regular surface.

By providing both the at least one first channel 1 and the at least one second channel 2, (i.e. providing the foam structure 10 with both partial perforation and full perforation), it is possible to modulate the properties of the foam structure 10 such as its mechanical resistance, sound insulation and water absorption. Absorption of water can be detrimental to the sound absorption properties of the foam and to the durability of the foam.

The combination of the at least one first channel 1 and the at least one second channel 2 helps to create a tortuous path for sound waves. Such a tortuous path is desirable for achieving good sound absorption properties. Furthermore, in an embodiment, the channels have a regular shape such as a cylinder, which further contributes to the tortuous path for sound.

In contrast, a foam layer that has only partial perforations does not have sufficiently good sound absorption properties throughout the whole thickness of the foam layer. Meanwhile, when manufacturing foam layers that have only full perforations, it is not possible to vary the full perforations so as to modulate of these properties well.

The present invention allows a foam structure 10 having a combination of partial and full perforations without requiring a lamination step. Hence a foam structure 10 having good sound properties can be produced easily and at a relatively low cost. Of course, in an embodiment, multiple foam structures 10 can be laminated to each other to produce a thicker composite foam structure 60.

In general, a thicker section of acoustic foam can absorb more sound than a thinner section of the same acoustic foam. Accordingly, for a required level of sound absorption, an acoustic foam structure 10 of the present invention can be made thinner than a foam structure that does not incorporate the combination of the first and second channels 1, 2. Alternatively, for a given thickness of foam, the acoustic foam structure 10 of the present invention can absorb more sound compared to a foam structure of the same thickness that does not incorporate the combination of the first and second channels 1, 2.

The present invention provides a sound barrier comprising the acoustic foam structure 10 of the present invention. The acoustic foam structure 10 of the present invention can also be used as a sound barrier in order to reduce the sound transmission from one place to another place. The acoustic foam structure 10 of the present invention may be used primarily for sound insulation. By itself, the acoustic foam structure 10 of the present invention can be used as a relatively lightweight sound barrier. The acoustic foam structure 10 of the present invention has better sound insulation properties compared to a foam structure in which only channels that extend fully through the foam structure are provided (i.e. without the channels that extend only partly through the foam structure). This is because sound waves can readily pass through channels that extend fully through a foam structure.

By incorporating the at least one second channel 2 that extends only partly through the acoustic foam structure 10, the sound waves cannot readily pass through the at least one second channel 2. However, the at least one second channel 2 allows the energy of the sound wave to be absorbed through the porous absorption mechanism described above. Hence, for a given level of perforation (e.g. percentage of open cells), the acoustic foam structure 10 of the present invention has better sound transmission loss performance compared to a foam structure in which only channels that extend fully through the foam structure are provided.

The sound barrier may comprise the acoustic foam structure 10 of the present invention and a layer of a porous material. The combination of the acoustic foam structure 10 with the layer of porous material forms a heavier sound barrier with better sound transmission loss performance.

The at least one second channel 2 and the at least one first channel 1 may be formed by puncturing the foam structure 10 through the upper surface 4 of the foam structure 10. The at least one first channel 1 extends fully through the foam structure 10 such that the at least one first channel 1 is in direct fluid communication with the environment immediately surrounding the foam structure 10 at both the upper surface 4 and the lower surface 5 of the foam structure 10. The upper surface 4 is opposite the lower surface 5. The upper surface 4 is substantially coplanar with the lower surface 5.

The at least one second channel 2 extends partially across the foam structure 10 from the upper surface 4 towards the lower surface 5. The at least one third channel 3 extends partially across the foam structure 10 from the lower surface 5 towards the upper surface 4.

Figure 3:
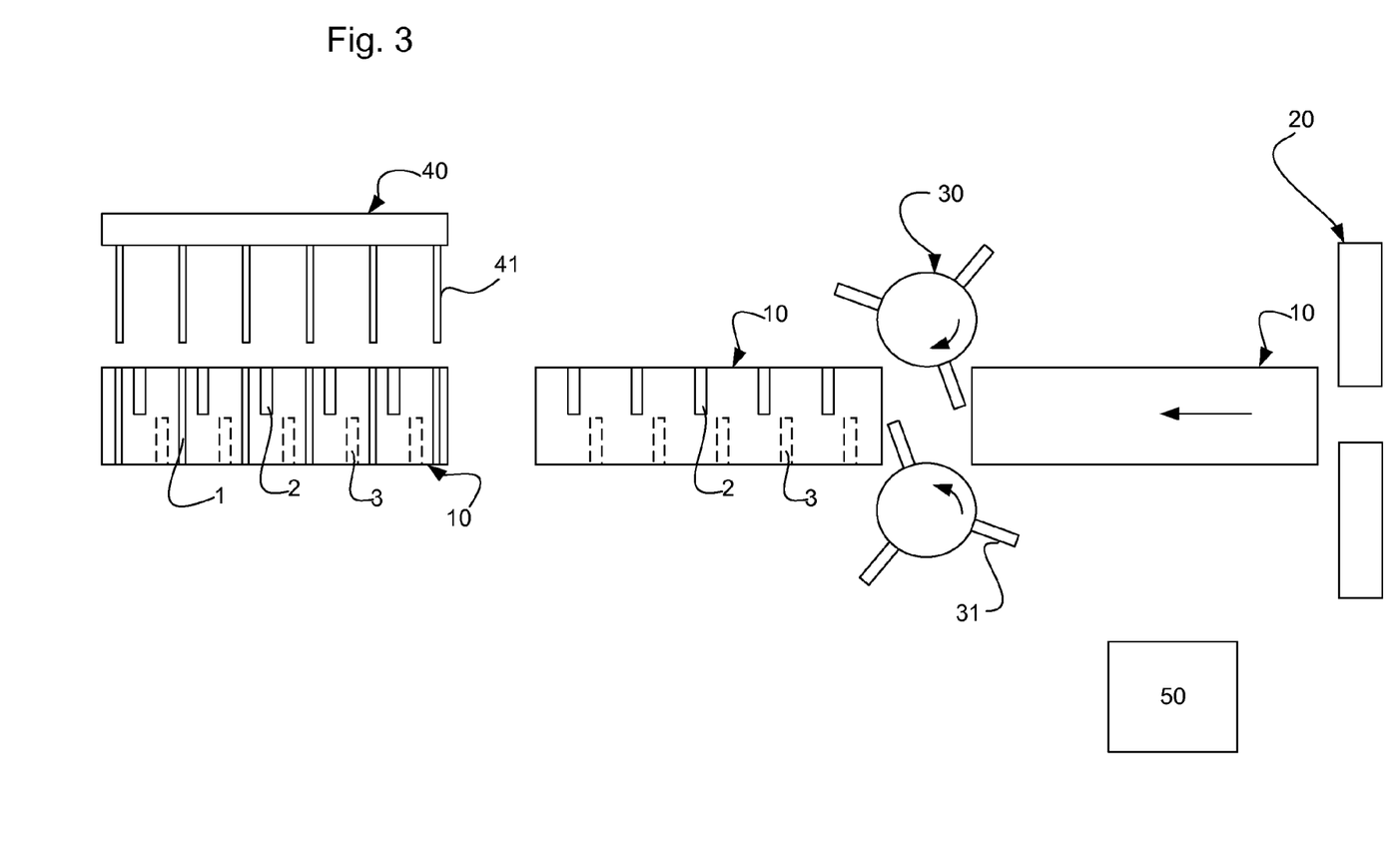
FIG. 3 depicts a process of producing a foam structure according to an embodiment of the invention.

In an embodiment, the step of perforating the foam structure 10 so as to form the at least one first channel 1 comprises puncturing the foam structure 10 with at least one first object elongate in a longitudinal direction by moving the at least one first elongate object 41 relative to the foam structure 10 substantially only in the longitudinal direction of the at least one first elongate object 41.

When forming the at least one first channel 1 in the foam structure 10, the foam structure 10 may be substantially motionless. The at least one first channel 1 may be formed by moving the at least one first elongate object 41 substantially perpendicularly through the foam structure 10 via the upper surface 4 of the foam structure 10.

This allows the at least one first channel 1 to have dimensions (e.g. width, diameter, length etc.) that are substantially the same as the dimensions of the at least one first elongate object 41. However, the width of the at least one first channel 1 may be less than a width of the at least one first elongate object 41. This is because resiliency of the foam structure 10 may cause the at least one first channel 1 to decrease in size after the at least one first channel has been withdrawn from the foam structure 10.

Perforating the foam structure 10 so as to form the at least one first channel 1 may comprise puncturing the foam structure 10 with a plurality of first elongate objects 41. The at least one first elongate object 41 may be a pointed or sharp object such as a needle, a pin, a spike, a nail, or the like. The at least one first elongate object 41 may be disposed on a rack 40. Alternative ways of the perforating the foam structure 10 so as to form the at least one first channel 1 include drilling, laser cutting, high-pressure fluid cutting, airguns, projectiles, or the like.

In an embodiment, the step of perforating the foam structure 10 so as to form the at least one second channel 2 and/or the at least one third channel 3 comprises puncturing the foam structure 10 with at least one second object elongate in a longitudinal direction by moving the at least one second elongate object 31 relative to the foam structure 10 both in the longitudinal direction and in a transverse direction of the at least one second elongate object 31. The terms "longitudinal direction" and "transverse direction" are defined from the point of view of the at least one second elongate object 31.

In an embodiment, the at least one second elongate object 31 is disposed on a rotating roller 30 so as to puncture the foam structure 10 with the at least one second elongate object 31.

Hence, perforation step for forming the at least one second channel 2 and/or the at least one third channel 3 may be accomplished by puncturing the foam structure 10 via the upper surface 4 and/or the lower surface 5 with the at least one second elongate object 31. The second elongate object 31 may be the same as, or different from, the first elongate object 41. In particular, the at least one second elongate object 31 may be pointed or sharp and in particular may be a needle, a pin, a spike, a nail, or the like.

The perforation step for forming the at least one second channel 2 and/or the at least one-third channel 3 may be a continuous process in which the at least one second elongate object 31 is/are arranged in a predetermined pattern on an outer surface of a rotating roller 30. In the case that the at least one third channel 3 is to be formed in addition to the at least one second channel 2, a pair of rotating rollers 30, each having at least one second elongate object 31 disposed thereon may be used.

The process of rotation of the rollers 30 when forming the channels 2, 3 may result in the at least one second channel 2 and optionally the at least one third channel 3 having an enlarged dimension compared to the at least one second elongate object 31. In an embodiment, the step of perforating the foam structure 10 so as to form the at least one second channel 2 and/or the at least one third channel 3 comprises puncturing the foam structure 10 with at least one second elongate object 31 so as to form the at least one second channel 2 and/or the at least one third channel 3 to have a width greater than a width of the at least one second elongate object 31. This is due to the transverse movement between the foam structure 10 and the at least one second elongate object 31.

An example of a possible perforation process for forming the at least one second channel 2 and/or the at least one-third channel 3 is reported in EP1026194.

The at least one second channel 2 may not be linear. In an embodiment, the at least one second channel 2 may have a conical shape. The conical shape may result form the relative movement between the foam structure 10 and the at least one second elongate object 31 during the perforation process. The at least one second channel 2 may have an irregular shape. The shape of the at least one second channel 2 can be determined by controlling the relative speed between the foam structure 10 and the at least one second elongate object 31 during the perforation step. The at least one third channel 3 may have a shape as described above in relation to the at least one second channel 2.

In an embodiment, an apparatus for performing the perforation method comprises a controller 50 configured to controlling the relative speed between the foam structure 10 and the at least one second elongate object 31. The controller 50 may be configured to control the speed of the foam structure 10 and the rotational speed of the rollers 30 independently. The controller 50 may be adapted to control the rotational speed of the at least one third elongate object 32.

The dimensions of the at least one first elongate object 41 may be the same as the dimensions of the at least one second elongate object 31. In an embodiment, a width of the at least one second channel 2, and optionally the at least one third channel 3 is greater than a width of the at least one first channel 1. This is because of the difference in the perforation technique used to form the at least one first channel 1 and the perforation technique used to form the at least one second channel 2 and at least one third channel 3.

As an alternative to the rotating rollers 30, a plate, or a pair of plates, arranged at a side of the foam structure 10 may be used to form the at least one second channel and/or the at least one third channel 3. The plate or plates may be moved towards the upper and/or lower surfaces 4, 5 of the foam structure 10 to form the at least one second channel 2 and/or the at least one third channel 3 within the foam structure 10. The plate or plates may be moved towards the upper and lower surfaces 4, 5 of the foam structure 10 either simultaneously or alternately. Each plate has at least one second elongate object 31 formed on its surface that faces the foam structure 10 so as to form the at least one second channel 2 and/or the at least one third channel 3.

The foam structure 10 may be moving during the perforating step for forming the at least one second channel 2 and/or the at least one third channel 3. In order to obtain channels 2, 3 that are as close as possible to the dimensions of the second elongate object 31, the plates may be driven in the same direction as the foam structure 10 is travelling and at the same speed during the perforation step. After the plates are retracted away from the foam structure 10, the plates may be moved back to their starting position.

In an embodiment, the at least one first channel 1, the at least one second channel 2 and optionally the at least one third channel 3 extend in substantially parallel directions. In an embodiment, the at least one first channel 1 and the at least one second channel 2 are formed by puncturing the same planar surface (e.g. the upper surface 4) of the foam structure 10. Accordingly, it is not necessary to have another surface of the foam structure 10 accessible in order to perform the perforation steps for forming the at least one first channel 1 and the at least one second channel 2.

The acoustic foam structure 10 of the present invention may take the form of a plank. The plank may have substantially rectangular dimensions.

The acoustic foam structure 10 may have a thickness (t) within the range of from about 5 mm to about 100 mm, more preferably within the range of from about 10 mm to about 50 mm, and even more preferably within the range of from about 15 mm to about 30 mm.

The acoustic foam structure 10 may have a width (w) within the range of from about 300 mm to about 2,500 mm, more preferably within the range of from about 400 mm to about 1,800 mm, more preferably within the range of from about 500 mm to about 1,100 mm, and even more preferably about 1,000 mm.

The acoustic foam structure 10 may have a length (l) within the range of from about 1,000 mm to about 5,000 mm, more preferably within the range of from about 2,000 mm to about 3,000 mm.

The at least one first channel 1 may have an average width within the range of from about 0.01 mm to about 5.0 mm, more preferably within the range from about 1.0 mm to about 3.0 mm, and even more preferably from about 1.5 mm to about 2.5 mm. The average width of the channels 1, 2, 3 may refer to a diameter of the channel 1, 2, 3, or otherwise a cross-sectional size of the channel 1, 2, 3.

The at least one first channel 1 may have a circular cross-section. However, other cross-sectional shapes are also possible such as square, elliptical or triangular, for example. The at least one first channel 1 may have any cross-sectional shape, including circular, oval, square, rectangular or any other polygonal configuration.

The average width of the at least one second channel and/or the at least one third channel may be within the range of from about 0.01 mm to about 5.0 mm, more preferably within the range of from about 1.0 mm to about 3.0 mm and even more preferably from about 1.5 mm to about 2.5 mm.

The at least one second channel 2 and the at least one third channel 3 may have substantially the same dimensions as each other. However, the dimensions of the at least one second channel 2 may be different from the dimensions of the at least one third channel 3.

In the arrangement depicted in FIG. 1, the at least one second channel 2 and the at least one third channel 3 do not overlap with each other. This means that there is no cross-section of the foam structure 10 that is parallel to the upper surface 4 of the foam structure 10 that includes both the at least one second channel 2 and the at least one third channel 3. In an embodiment, the at least one second channel 2 and the at least one third channel 3 overlap. The at least one second channel 2 and the at least one third channel 3 may extend through more than 50% of the thickness t of the foam structure 10.

In an embodiment, the percentage of the thickness (t) of the foam structure 10 that the at least one second channel 2 and the at least one third channel 3 may extend through is within the range of from about 25% to about 85%, more preferably within the range of from about 60% to about 80%, more preferably within the range of from about 75% to about 80%, and even more preferably about 75%. The at least one second channel 2 is separate from the at least one third channel 3.

The depth of the at least on second channel 2 and the depth of the at least one third channel 3 may be controlled by controlling the depth to which the at least one second elongate object 31 and the at least one third elongate object 32 penetrate the foam structure 10. This may be accomplished by selecting the length of the at least one second elongate object 31 and the at least one third elongate object 32.

In an embodiment in which opposing rotating rollers 30 are provided, the controller 50 may be configured to adjust the distance between the rotational axes of the rollers 30. In an embodiment in which a pair of plates is provided, the controller 50 may be configured to control the extent of movement of the plates towards the surface of the foam structure 10 so as to control the penetration depth.

In the arrangement depicted in FIG. 1, the at least one second channel 2 and the at least one third channel 3 are offset from each other. In an embodiment, the at least one second channel 2 and the at least one third channel 3 are aligned with each other.

The at least one second channel 2 may have an elliptical cross-section, with the major axis in the direction of transverse movement between the foam structure 10 and the at least one second elongate object 31 during the step of perforating the foam structure 10 so as to form the at least one second channel 2 and/or the at least one third channel 3.

The direction of transverse movement may be the same as the direction of extrusion of the foam structure 10 during the step of extruding the foam structure 10. However, other cross-sectional shapes are also possible such as square, circular or triangular, for example. The at least one second channel 2 and the at least one third channel 3 may have any cross-sectional shape, including circular, oval, square, rectangular or any other polygonal configuration.

In an embodiment, the at least one second channel 2 and the at least one third channel 3 extend through a percentage of the thickness (t) of the acoustic foam structure 10 within the range of from about 25% to about 50%, and more preferably within the range of from about 40% to about 50%. The at least one second channel 2 does not come into direct contact with the at least one third channel 3. The at least one second channel 2 is separate from the at least one third channel 3.

The channels 1, 2, 3 may be substantially straight and linear. However, the channels 1, 2, 3 may not be completely straight and may be curvilinear, for example.

Figure 2:
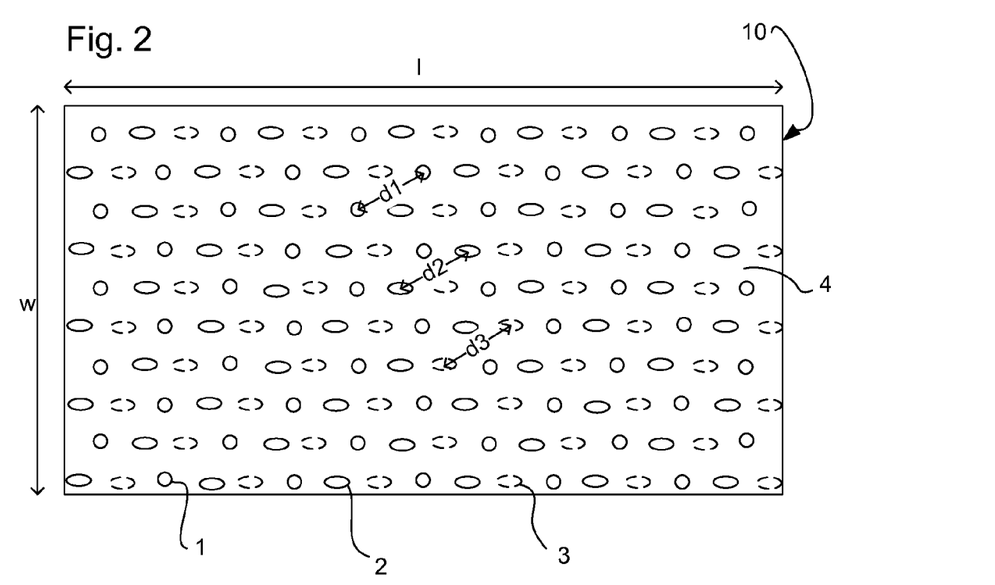
FIG. 2 is a plan view of the acoustic foam structure of FIG. 1.

FIG. 2 is a plan view of the foam structure of FIG. 1. FIG. 2 illustrates an exemplary arrangement of the at least one first channel 1, the at least one second channel 2 and the at least one third channel 3. Other arrangements are possible. The arrangement of the at least one first channel 1, the at least one second channel 2 and the at least one third channel 3 is not particularly limited.

The acoustic foam structure 10 may comprise a plurality of first channels 1, a plurality of second channels 2 and optionally a plurality of third channels 3.

The first channels 1 may be formed in a triangular pattern. An average spacing d1 between the first channels 1 may be within the range of from about 2 mm to about 20 mm, more preferably within the range of from about 5 mm to about 10 mm and more preferably about 8 mm.

In an embodiment, the at least one second channel 2 is offset from the at least one third channel 3, as shown in FIG. 2. The density of second channels 2 may be substantially equal to the density of third channels 3. The density of channels means the number of channels per unit area of the foam structure 10.

The density of second channels 2 may be substantially equal to the density of first channels 1. In the arrangement depicted in FIG. 2, about one third of the total number of channels are first channels 1, one third are second channels 2 and one third are third channels 3. In an embodiment, the percentage of total channels that are first channels 1 is within the range of from about 25% to about 75%, more preferably within the range of from about 40% to 60% and more preferably about 50%. In an embodiment, the percentage of total channels that are second channels 2 is within the range of from about 25% to about 75%, more preferably within the range of from about 40% to 60% and more preferably about 50%. In an embodiment, the percentage of total channels that are third channels 3 is within the range of from about 25% to about 50%, more preferably within the range of from about 30% to 40% and more preferably about 33%.

The second channels 2 and the third channels 3 may be formed in a triangular pattern. An average spacing d2 between the second channels 2 may be within the range of from about 2 mm to about 20 mm, more preferably within the range of from about 5 mm to about 10 mm and more preferably about 8 mm. An average spacing d3 between the third channels 3 may be within the range of from about 2 mm to about 20 mm, more preferably within the range of from about 5 mm to about 10 mm and more preferably about 8 mm.

In an embodiment, the average spacings d1, d2, d3 are substantially equal. However, the average spacings d1, d2, d3 may be different from each other.

The second channels 2 may be offset from the third channels 3 by a fraction of the distance between the channels 2, 3 so that each second channel 2 is positioned in approximately the centre of a triangle formed by three third channels 3.

The channels 1, 2, 3 may be perpendicular to the upper and lower surfaces 4, 5 of the foam structure 10. Although the channels 1, 2, 3 are depicted in the Figures as being oriented substantially perpendicular to the extrusion or elongation direction of the foam structure 10, this need not be the case.

The channels 1, 2, 3 may be formed at an angle with respect to the normal to the upper and lower surfaces 4, 5. In an embodiment, channels 1, 2, 3 are formed at an angle of +/−60° and more preferably +/−45° with respect to the normal to the upper and lower surfaces 4, 5.

Table 1 below indicates how the normal incidence sound absorption coefficient of a foam structure 10 of the present invention varies with respect to varying frequency of incident sound. The normal incidence sound absorption coefficient of a surface is related to the fraction of the perpendicularly incident sound power absorbed or otherwise not reflected by the surface. The test corresponding to Table 1 was performed according to UNI EN ISO 10534-2.

TABLE 1

| Frequency of incident sound/Hz | Normal incidence sound absorption coefficient |
| --- | --- |
| 200 | 0.075 |
| 250 | 0.10 |
| 315 | 0.15 |
| 400 | 0.26 |
| 500 | 0.43 |
| 630 | 0.66 |
| 800 | 0.94 |
| 1000 | 0.80 |
| 1250 | 0.73 |
| 1600 | 0.87 |
| 2000 | 0.68 |
| 2500 | 0.57 |
| 3150 | 0.55 |
| 4000 | 0.50 |

The sample of the foam structure 10 corresponding to the test results of Table 1 had a thickness (t) of 30 mm. The foam structure 10 was a unitary foam structure 10 (i.e. formed from a single layer of perforated foam material, not formed from a laminated stack of perforated foam layers). The foam structure showed first channels that extends fully through the acoustic foam structure and second channels that extends only partly through the acoustic foam structure. The density of second channels 2 on a major surface of the foam structure 10 was 4153 $m^{-2}$. The diameter of the second elongate objects 31 was 1.4 mm. The density of first channels 1 was 4444 $m^{-2}$. The diameter of the first elongate objects 41 was 1.9 mm. The sound was incident on the surface of the foam structure that included both the first channels 1 and the second channels 2.

Figure 4:
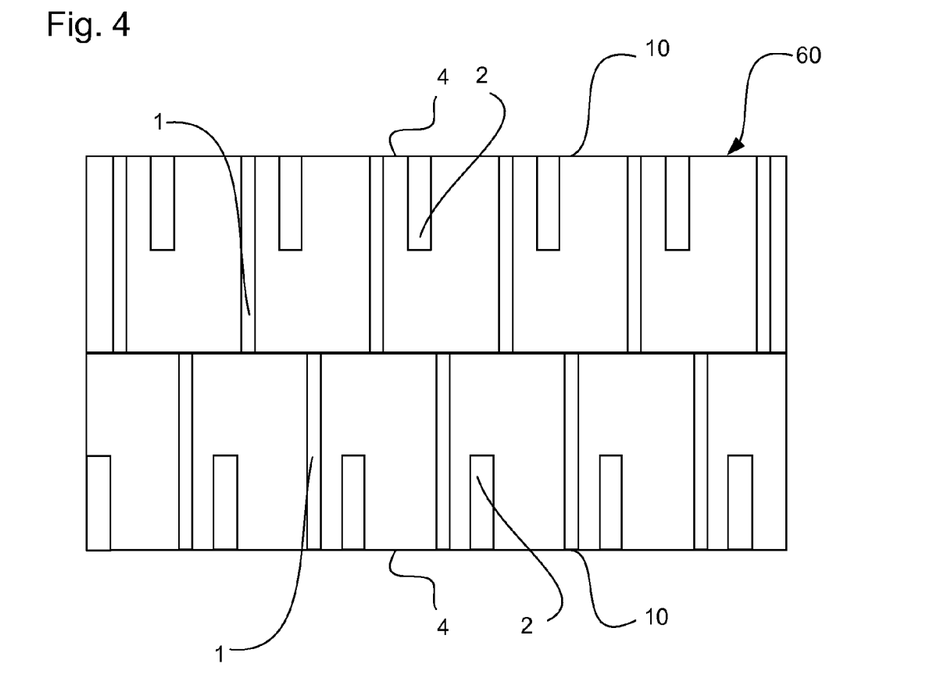
FIG. 4 is a cross-sectional view of a composite foam structure of an embodiment of the present invention.

Table 2 below indicates how the sound absorption coefficient of a composite foam structure 60 formed from two laminated unitary foam structures 10 of the present invention varies with respect to varying frequency of sound. The test corresponding to Table 2 was performed according to UNI EN ISO 354 (Reverberation room). The room volume was 196 $m^2$ and the sample tested surface was 12 $m^2$.

TABLE 2

| Frequency of sound/Hz | sound absorption coefficient |
|---|---|
| 100 | 0.09 |
| 125 | 0.15 |
| 160 | 0.21 |
| 200 | 0.43 |
| 250 | 0.85 |
| 315 | 1.05 |
| 400 | 0.88 |
| 500 | 0.77 |
| 630 | 0.86 |
| 800 | 0.95 |
| 1000 | 0.86 |
| 1250 | 0.89 |
| 1600 | 0.84 |
| 2000 | 0.94 |
| 2500 | 0.99 |
| 3150 | 1.00 |
| 4000 | 1.09 |
| 5000 | 1.36 |

The sample of the foam structure corresponding to the test results of Table 2 had a thickness (t) of 60 mm. The foam structure was a composite foam structure 60 formed from two laminated unitary foam structures 10. The two laminated unitary foam structures contacted each other at the major surfaces that included only the first channels 1 and not the second channels 2. Hence, the second channels 2 remained on the external major surfaces of the composite foam structure 10. The density of second channels 2 was 4153 $m^{-2}$. The diameter of the second elongate objects 31 was 1.4 mm. The density of the first channels 1 was 4444 $m^{-2}$. The diameter of the first elongate objects 41 was 1.9 mm.

Table 3 indicates the practical coefficients of sound absorption calculated from data reported in Table 2 according to UNI EN ISO 11654. The practical coefficient of sound absorption is related to the value of the sound absorption coefficient averaged over an octave.

TABLE 3

| Octave range/Hz | Practical coefficient of sound absorption |
|---|---|
| 100-160 | 0.15 |
| 200-315 | 0.80 |
| 400-630 | 0.85 |
| 800-1250 | 0.90 |
| 1600-2500 | 0.95 |
| 3150-5000 | 1.15 |

The results of Table 3 give a weighted coefficient of sound absorption of 0.90, excluding the result for the octave range of 100-160 Hz because this octave range is not covered by UNI EN ISO 11654. This weighted coefficient compares favourably to those of known acoustic foam and it allows classifying this foam composite as an acoustic foam of Class A as prescribed by UNI EN ISO 11654. Table 4 reports the classification ranges:

TABLE 4

| Classes of sound absorption according to UNI EN ISO 11654 | Weighted coefficient of sound absorption |
|---|---|
| A | 0.90; 0.95; 1.00 |
| B | 0.80; 0.85 |
| C | 0.60; 0.65; 0.70; 0.75 |
| D | 0.30; 0.35; 0.40; 0.45; 0.50; 0.55 |
| E | 0.25; 0.20; 0.15 |
| unclassified | 0.10; 0.05; 0.00 |

The perforations steps of the present method can be performed in any order, namely first perforating the foam structure so as to form at least one first channel that extends fully through the foam structure and then perforating the foam structure so as to form at least one second channel that extends only partly through the foam structure, or in alternative first perforating the foam structure so as to form at least one second channel that extends only partly through the foam structure and then perforating the foam structure so as to form at least one first channel that extends fully through the foam structure.

Similarly, the optional perforation to form the at least one third channel may be performed before, simultaneously or after the other steps.

In an embodiment, the perforation step for forming the at least one second channel 2 and the at least one third channel 3 is performed after the step of perforating the foam structure 10 so as to form the at least one first channel 1. This allows the at least one second channel 2 and the at least one third channel 3 to be formed by puncturing the foam structure 10 while the foam structure is cooling after extrusion and expansion. In another embodiment, the perforation step for forming the at least one second channel 2 and the at least one third channel 3 is performed before the step of perforating the foam structure 10 so as to form the at least one first channel 1.

A method of producing a perforated foam structure 10 according to the present invention may comprise the steps of producing a foam structure 10 by extrusion, and perforating the foam structure 10 by the above-described method. A method of producing a foam structure 10 by extrusion is described below.

FIG. 3 depicts a process of producing the foam structure according to an embodiment of the invention. Arrows depicts direction of motion.

The acoustic foam structure 10 of the present invention may be formed from a polymeric foam. A mass of a polymer is provided in a flowable state. The polymer may be, for example, a low-density polyethylene. Other polymers that are possible are other polyolefins such as polypropylene and polybutene or other polymers such as polystyrene, polyurethanes, polyesters and polyisocyanurates. The polymer should be a foamable thermoplastic or thermosetting material. The polymer may comprise a blend of two or more thermoplastic materials or thermosetting materials.

A nucleating agent is added to the polymer. The nucleating agent is for promoting nucleation and to control cell development and size in the foam structure 10. Examples of possible nucleating agents include zinc oxide, zirconium oxide, talc and sodium bicarbonate/citric acid blends, for example. The amount of nucleating agent that is added is determined so as to achieve the desired cell size in the foam. The cell size affects the acoustic properties such as the acoustical attenuation of the foam structure 10. In addition to the feeding of the nucleating agent, the perforation of the closed cells of the foam structure has an effect on the sound properties of the foam structure 10.

Other components such as a flame retardant, an antioxidant and an aging modifier may be added to the polymer mix to produce a melt under high pressure and high temperature. The melt is provided in a hopper of an extruder where the melt is mixed. A blowing agent is added to the polymer mix. The blowing agent may be, for example, a fluorocarbon, a hydrofluorocarbon, a chlorofluorocarbon, a hydrochlorofluorocarbon, an alkylhalide or a hydrocarbon, for example.

The mixture of the polymer melt and the blowing agent is formed to a desired shaped by extrusion through a die 20.

The blowing agent is then expanded by introducing the shaped mixture to a lower pressure environment. This forms the foam structure 10 comprising pores or cells dispersed throughout a polymer matrix. The foam structure 10 may then be solidified or at least partially solidified before being perforated by the perforating method of the present invention.

The foam structure 10 desirably have an average cell size that is at least 2 mm, preferably at least 3 mm, more preferably at least 4 mm, but it can be 6 mm or 7 mm or larger.

In an embodiment, the foam structure 10 has a higher temperature than its surrounding environment during the step of perforating the foam structure 10 so as to form the at least one second channel 2 and the at least one third channel 3.

The method of producing the foam structure 10 may comprise the step of cooling the foam structure 10. The step of perforating the foam structure 10 so as to form the at least one second channel 2 and the at least one third channel 3 may take place before, during or after the step of cooling. The step of perforating the foam structure 10 so as to form the at least one first channel 1 may take place before, during or after the step of cooling.

In the arrangement depicted in FIG. 3, the rack 40 having the at least one first elongate object 41 disposed thereon is downstream of the rollers 30 having the at least one second elongate object 31 disposed thereon. However, the rack 40 having the at least one first elongate object 41 disposed thereon may be upstream of the rollers 30 having the at least one second elongate object 31 disposed thereon.

The perforation step for forming the at least one second channel 2 and/or the at least one third channel 3 may be performed approximately 2 to 90 minutes, after initiation of the free foam expansion following extrusion of the foam to form the foam structure 10. The expanded foam structure 10 may be guided between the pair of rotating rollers 30, or adjacent a single rotating roller 30, whereupon rotation of the rollers 30 causes the at least one second elongate object 31 to penetrate the upper and lower surfaces 4, 5 of the foam structure 10 to form the at least one second channel 2 and optionally the at least one third channel 3.

The perforation method may be continuous. In an embodiment, the foam structure 10 is manufactured through a continuous process comprising extrusion and the perforation steps. This has the advantage of being a particularly economical way of manufacturing the foam structure 10. However, the foam structure 10 may be manufactured through a discontinuous process.

The perforation method of the present invention has the further advantage of accelerating the release of the blowing agent from the solidified foam structure 10. This is particularly advantageous in the case that the blowing agent is in some way harmful. For example, if the blowing agent is a hydrocarbon, then the blowing agent is flammable. The level of blowing agent in the foam structure 10 should be reduced to an acceptable level before the foam structure 10 is used in any product. By perforating the foam structure 10 so as to form the channels 1, 2, 3, the blowing agent is released from the foam structure 10 more quickly.

Once the foam structure 10 has been perforated, the foam structure 10 may be wound to produce a roll. The roll of the foam structure 10 undergoes an aging process in order to allow the blowing agent to be replaced by another gas such as air inside the cells of the foam structure.

The roll may be laminated according to any lamination technique well known in the art, preferably by melt welding with hot air to other rolls, preferably keeping the at least one second channel 2 on the external side of the structure.

Alternatively or additionally, the foam structure 10 may be cut into sheets in order to produce planks with the desired thickness (t), length (l) and width (w). The cutting step may be performed before, during or after the method of perforating.

FIG. 4 depicts a composite foam structure 60 according to an embodiment of the invention. The composite foam structure 60 comprises at least two unitary foam structures 10. The unitary foam structures 10 are laminated on each other in a stack. In an embodiment the composite foam structure 60 comprises two unitary foam structures 10. However, the composite foam structure 60 may comprise more than two unitary foam structures 10.

Forming a composite foam structure 60 from unitary foam structures 10 makes it possible to produce perforated foam structures of any thickness. Without such lamination it can be difficult to perforate extruded foams of large thicknesses. It is easier to perforate thinner unitary foam structures 10 that can then be assembled to form a thicker composite foam structure 60.

The lamination of at least two perforated unitary foam structures 10 contributes to the tortuous path for incident sound on the composite foam structure 60.

The composite foam structure 60 depicted in FIG. 4 comprises two unitary foam structures 10. A major surface of one of the unitary foam structures 10 is laminated onto a major surface of the other unitary foam structure 10. Preferably, the laminated surfaces are the surfaces 5 that comprise only the at least one first channel 1 and not the at least one second channel 2. However, the laminated surfaces may be the surface 4 that comprises the at least one second channel 2. In an embodiment, the planar surface 4 of one unitary foam structure 10 that comprises at least one second channel 2 is laminated to the planar surface 5 of another unitary foam structure 10 that does not comprise the at least one second channel 2.

In the case of unitary foam structures 10 that comprise third channels 3, the laminated surface may be either the surface 4 comprising the at least one second channel 2 or the surface 5 comprising the at least one third channel 3.

The first channels 1 of one of the unitary foam structures 10 may be offset from the first channels 1 of the other unitary foam structure 1, as depicted in FIG. 4. Hence, in an embodiment, substantially each of the at least one first channel 1 of one of the unitary foam structures 10 is offset from all of the at least one first channel 1 of the other of the unitary foam structures 10.

Figure 5:
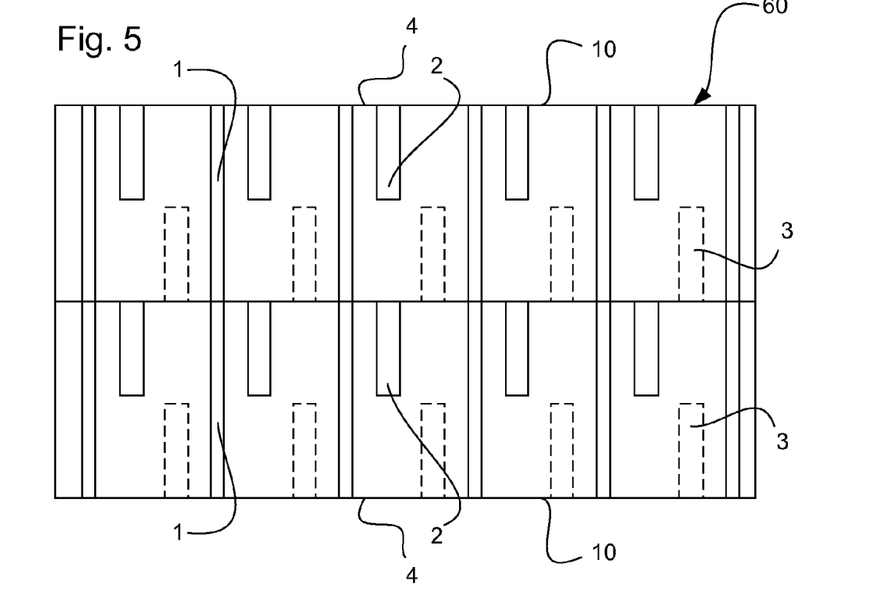
FIG. 5 is a cross-sectional view of a composite foam structure of an embodiment of the present invention.

FIG. 5 depicts an embodiment in which the first channels 1 of one of the unitary foam structures 10 align with the first channels 1 of the other unitary foam structure 10. Hence, in an embodiment, substantially each of the at least one first channel 1 of one of the unitary foam structures 10 is aligned with a corresponding at least one first channel 1 of the other of the unitary foam structures 10.

Perfect linear alignment of each and every first channel 1 in between the two unitary foam structures 10 is virtually impossible. The composite foam structure 60 may have fewer than all, and typically few if any, first channels 1 that align so as to extend in a continuous fashion from one major external surface of the composite foam structure 60 to an opposing major external surface of the composite foam structure 60 without experiencing a narrowing or restriction of the perforation channel due to less than perfect alignment of the first channels 1 between the unitary foam structures 10.

Hence, although FIG. 4 depicts an embodiment in which all of the first channels 1 appear to be offset from each other and FIG. 5 depicts an embodiment in which all of the first channels appear to be aligned with each other, a composite foam structure 60 of the present invention may have a mixture of aligned and offset first channels 1. According to an embodiment two unitary foam structures 10 are laminated so as to produce a double-foam having a random arrangement of first channels 1 and second channels 2.

In an embodiment, at least one of the at least one first channel 1 of one unitary foam structure 10 is offset from all of the at least one first channel 1 of the other unitary foam structure 10. At least one of the at least one first channel 1 of one unitary foam structure 10 is aligned with a corresponding at least one first channel 1 of the other unitary foam structure 10.

In an embodiment, at least one second channel 2 of one unitary foam structure 10 may be aligned with a first channel 1 of another unitary foam structure 10. First channels 1 can be coupled to second channels 2 in a laminated composite foam structure 60 in this way.

In an embodiment, a unitary foam structure 10 of the present invention may be laminated to a foam layer that comprises only full perforations and no partial perforations. The unitary foam structure 10 may be laminated to the foam layer having only full perforations either via the layer 4 comprising the at least one second channel 4, or via the opposite surface 5 which may optionally comprise the at least one third channel 3.

The invention claimed is:

1. A composite acoustic foam structure for sound insulation or absorption comprising:
    a first foam structure having a plurality of first channels that extend fully through the first foam structure and a plurality of second channels that extend only partly through the first foam structure; and
    a second foam structure having a plurality of first channels that extend fully through the second foam structure, wherein a perforated surface of the second foam structure is fully laminated to a perforated surface of the first foam structure.

2. The composite acoustic foam structure of claim 1 wherein the plurality of second channels of the first foam structure extend from 25% to 85% through the thickness of the first foam structure.

3. The composite acoustic foam structure of claim 1 wherein the plurality of second channels of the first foam structure extend from 60% to 80% through the thickness of the first foam structure.

4. The composite acoustic foam structure of claim 1 wherein the first foam structure has a total number of channels and the plurality of first channels of the first foam structure comprise from 25% to 50% of the total number of channels.

5. The composite acoustic foam structure of claim 1 wherein:
    the average spacing between each of the first channels of the plurality of first channels of the first foam structure is from 2 mm to 20 mm; and
    the average spacing between each of the second channels of the plurality of second channels of the first foam structure is from 2 mm to 20 mm.

6. The composite acoustic foam structure of claim 1 wherein:
    the first foam structure has a thickness of from 10 mm to 50 mm; and
    the second foam structure has a thickness of from 10 mm to 50 mm.

7. The composite acoustic foam structure of claim 1 wherein:
    the average width of the first channels of the plurality of first channels of the first foam structure is from 1.0 mm to 3.0 mm; and
    the average width of the second channels of the plurality of second channels of the first foam structure is from 1.0 mm to 3.0 mm.

8. The composite acoustic foam structure of claim 1 wherein the plurality of first channels of the first foam structure are offset from the plurality of first channels of the second foam structure.

9. The composite acoustic foam structure of claim 1 wherein the second foam structure has a plurality of second channels that extend only partly through the second foam structure.

10. The composite acoustic foam structure of claim 9 wherein:
    the plurality of second channels of the first foam structure extend from 25% to 85% through the thickness of the first foam structure; and
    the plurality of second channels of the second foam structure extend from 25% to 85% through the thickness of the first foam structure.

11. The composite acoustic foam structure of claim 9 wherein:
    the plurality of second channels of the first foam structure extend from 60% to 80% through the thickness of the first foam structure; and
    the plurality of second channels of the second foam structure extend from 60% to 80% through the thickness of the first foam structure.

12. The composite acoustic foam structure of claim 9 wherein:
    the first foam structure has a total number of channels and the plurality of first channels of the first foam structure comprise from 25% to 50% of the total number of channels; and
    the second foam structure has a total number of channels and the plurality of first channels of the second foam structure comprise from 25% to 50% of the total number of channels.

13. The composite acoustic foam structure of claim 9 wherein:
    the first foam structure has a plurality of third channels that extend only partly through the first foam structure and extend from the surface opposite from the surface from which the plurality of second channels extend.

14. A method of making the composite acoustic foam structure of claim 1 comprising:
    forming the first foam structure by moving a plurality of first elongate objects in the longitudinal direction of the plurality of first elongate objects to puncture a foam structure with the plurality of first elongate objects to form the plurality of first channels and by puncturing the foam structure with a plurality of second elongate objects disposed on a rotating roller to form the plurality of second channels in the foam structure;
    forming the second foam structure by moving a plurality of first elongate objects in the longitudinal direction of the plurality of first elongate objects to puncture a foam structure with the plurality of first elongate objects to form the plurality of second channels; and
    laminating the second foam structure to the first foam structure.

15. The method of claim 14 wherein the foam structure is motionless while the plurality of first elongate objects punctures the foam structure and the foam structure is in motion while the plurality of second elongate objects punctures the foam structure.

16. The method of claim 14 wherein the plurality of first elongate objects move substantially perpendicularly relative the foam structure to puncture the foam structure.

17. A method of making the composite acoustic foam structure of claim 9 comprising:
 forming the first foam structure by moving a plurality of first elongate objects in the longitudinal direction of the plurality of first elongate objects to puncture a foam structure with the plurality of first elongate objects to form the plurality of first channels and by puncturing the foam structure with a plurality of second elongate objects disposed on a rotating roller to form the plurality of second channels in the foam structure;
 forming the second foam structure by moving a plurality of first elongate objects in the longitudinal direction of the plurality of first elongate objects to puncture a foam structure with the plurality of first elongate objects to form the plurality of second channels and by puncturing the foam structure with a plurality of second elongate objects disposed on a rotating roller to form the plurality of second channels in the foam structure; and
 laminating the second foam structure to the first foam structure.

* * * * *